(12) United States Patent
Tyagi et al.

(10) Patent No.: US 8,552,587 B2
(45) Date of Patent: Oct. 8, 2013

(54) POWER CONVERSION FOR DISTRIBUTED DC SOURCE ARRAY

(75) Inventors: Sunit Tyagi, Bangalore (IN); Hemanshu Bhatt, Bangalore (IN)

(73) Assignee: igrenEnergi Semiconductor Technologies Pvt. Ltd., Mumbai (IN)

( * ) Notice: Subject to any disclaimer, the term of this patent is extended or adjusted under 35 U.S.C. 154(b) by 588 days.

(21) Appl. No.: 12/840,130

(22) Filed: Jul. 20, 2010

(65) Prior Publication Data

US 2012/0019072 A1 Jan. 26, 2012

(51) Int. Cl.
*H02J 1/10* (2006.01)

(52) U.S. Cl.
USPC ............................................................ 307/43

(58) Field of Classification Search
USPC .......................................... 307/43, 72, 80, 82
See application file for complete search history.

(56) References Cited

U.S. PATENT DOCUMENTS

| 4,680,690 | A | 7/1987 | Dickerson |
| 5,625,539 | A | 4/1997 | Nakata et al. |
| 5,898,585 | A | 4/1999 | Sirichote et al. |
| 6,031,736 | A | 2/2000 | Takehara et al. |
| 2009/0261655 | A1 | 10/2009 | Kernahan |
| 2009/0284240 | A1* | 11/2009 | Zhang et al. .................. 323/285 |

* cited by examiner

*Primary Examiner* — Carlos Amaya
(74) *Attorney, Agent, or Firm* — Alleman Hall McCoy Russell & Tuttle LLP

(57) ABSTRACT

Embodiments related to the conversion of DC power to AC power are disclosed. For example, one disclosed embodiment provides a power conversion system, comprising a plurality of direct current (DC) power sources, a plurality of power output circuits connected to one another in a parallel arrangement, each power output circuit being connected to a corresponding DC power source to receive power from the corresponding DC power source and to selectively discharge power received from the corresponding DC power source, a power combiner configured to combine power received from the plurality of power output circuits to form a combined power signal, an output stage configured to convert the combined power signal into an AC signal or a DC signal, and a controller in electrical communication with each power outlet circuit and the power combiner to control the output of power by the power converter.

27 Claims, 10 Drawing Sheets

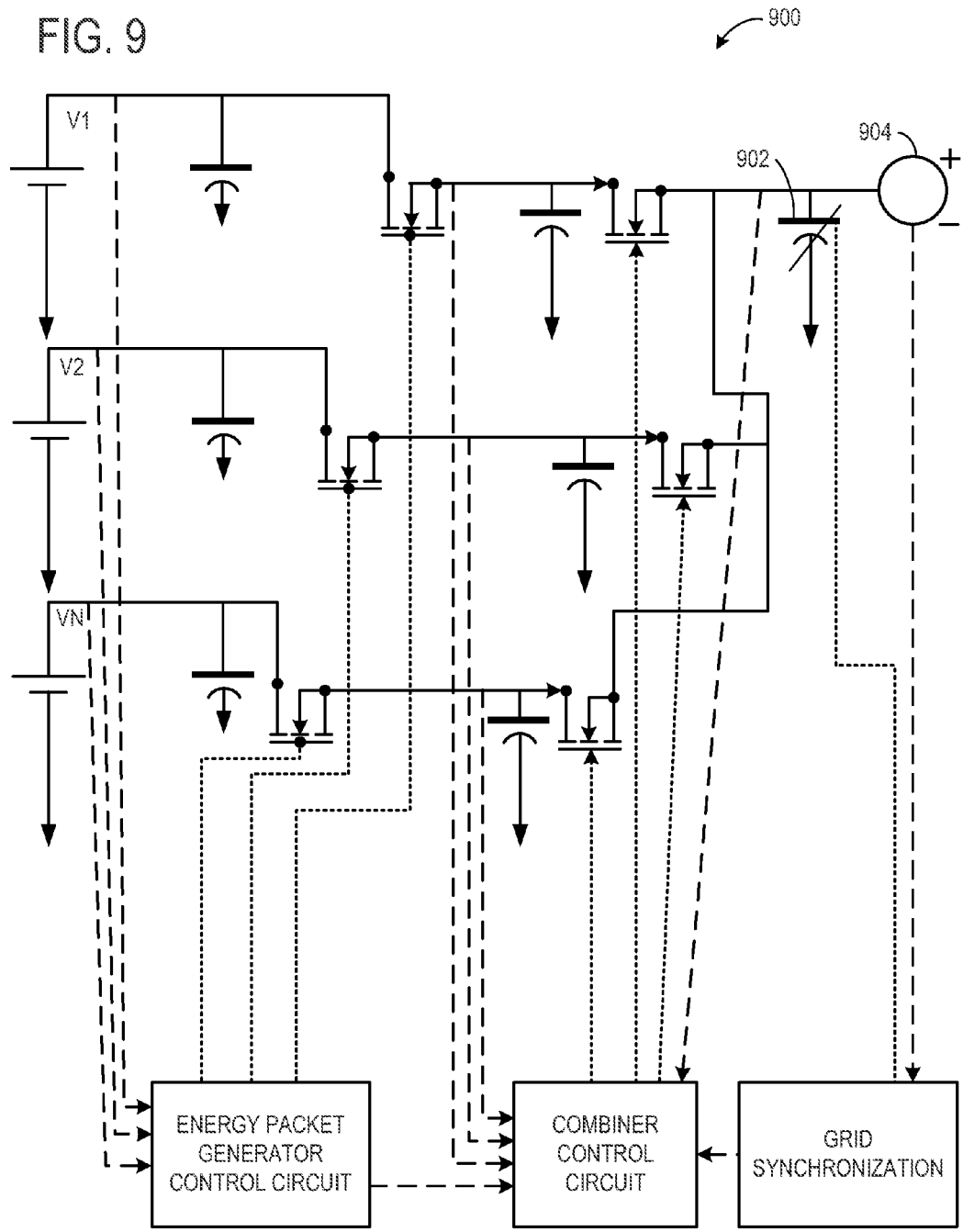

POWER CONVERSION FOR DISTRIBUTED DC SOURCE ARRAY

BACKGROUND

Typical appliances and loads in residences, commercial use and industries are run on alternating current (AC) power due to the efficiencies of usage, generation and distribution of AC power. As such, the use of power conversion devices is widely accepted for commercial or grid power from independent direct current (DC) sources, such as batteries and solar cells used to generate electrical power AND/or store it for later use.

Many known power conversion devices utilize a DC source connected to a commutating or power conversion device bridge, which creates a square, stepped or sinusoidal voltage wave by using several switching devices. The DC power source is insulated from the AC output using layers of components such as switches and transformers. The generated voltage is filtered and modified to match the grid requirements by the way of number of feedback mechanisms such as pulse width modulation techniques and filters.

FIG. 11 shows one example of a known power conversion device in the form of a power conversion bridge circuit 1100. Bridge circuit 1100 allows DC power to be converted into AC power via manipulation of switches S1, S2, S3 and S4 to produce a desired AC output waveform. Table 1 illustrates how the switching states of switches S1-S4 affect an output voltage $V_x$ of bridge circuit 1100.

TABLE 1

| Switch S1 | Switch S2 | Switch S3 | Switch S4 | $V_X$ | Comment |
|---|---|---|---|---|---|
| ON | OFF | OFF | ON | $+V_{DC}$ | Positive wave |
| OFF | ON | ON | OFF | $-V_{DC}$ | Negative wave |
| ON | OFF | ON | OFF | 0 | Net zero |
| OFF | ON | OFF | ON | 0 | Net zero |

With bridge circuit 1100, the use of appropriate switching sequence and timing allows the creation of a desired waveform, and also allows the control of harmonic content in the output waveform. Further, ripple and harmonics in the output signal may be filtered by using resonant loads, tank circuits, or external filters with band pass characteristics to limit the presence of noise in output.

In some distributed DC networks, plural DC sources may be interconnected in a series-parallel combination. The series combination of DC sources gives higher DC voltages and may be used to bring operational voltages to desired levels. On the other hand, the overall power is increased by combining multiple legs of sources in parallel.

However, one issue with a DC network of series-parallel combination is that any individual source mismatch may lead to significant loss of power in the network. Specifically, any defect in one source throttles the output from all series-connected sources. Likewise, parallel legs having sources with lower voltages may sink the power from other legs instead of sourcing, and thus may reduce the overall output. This may happen in case of solar cells arrayed together, where the output from a cell will be degraded or reduced due to shading of the cells. Even a single cell which is shaded will reduce its own output, as well as the output of the module in which the cell is located. Likewise, a shaded module will reduce the output from a string of series-connected modules. In many solar installations, multiple strings of series-connected modules are paralleled together to achieve desired output power levels. Thus, the impact of a loss of power from a cell can be severe and result in significant power loss for an entire solar cell array when connected in this manner. Further, in some environments, even during normal operation, there may be a statistical variation between the power output from individual DC sources as high as ten percent.

SUMMARY

Accordingly, various embodiments are disclosed herein that relate to the conversion of DC power to AC power to address the above-described issues. For example, one disclosed embodiment provides a power conversion system, comprising a plurality of direct current (DC) power sources, a plurality of power output circuits connected to one another in a parallel arrangement, each power output circuit being connected to a corresponding DC power source to receive power from the corresponding DC power source and to selectively discharge power received from the corresponding DC power source, a power combiner configured to combine power received from the plurality of power output circuits to form a combined power signal, an output stage configured to convert the combined power signal into an AC signal or a DC signal, and a controller in electrical communication with each power outlet circuit and the power combiner to control the output of power by the power converter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 shows an embodiment of a power conversion system that comprises a capacitive output stage.

DETAILED DESCRIPTION

Figure 11:
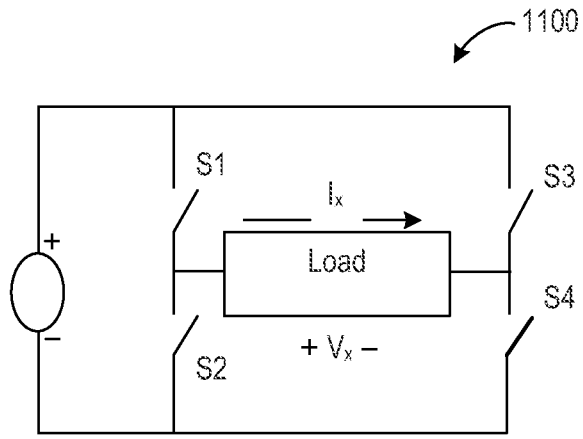
FIG. 11 shows a conventional power conversion circuit.

One potential issue with the power conversion bridge circuit 1100 shown in FIG. 11 is the variability of current as seen at the input DC source. This is especially of concern for DC sources such as solar cells, which work optimally near a point of maximum power. Another issue with power conversion bridge circuit 1100 is that the filtering of harmonics may lead to loss of energy and reduction of efficiency of conversion. Further, the network of switches S1-S4 may require complex controls and feedback mechanisms to ensure the synchronization of output to the load as well maintain a sinusoid output and a maximal power output that are desirable for variable loads.

Additionally, the arrangement of power conversion bridge circuit 1100 does not account for the distributed nature of the DC sources. The arrangement of circuit 1100 assumes that each source is independent of others, and that the delivery of the DC power to the bridge is lossless. However, in reality, the various DC sources may be interconnected in a series-parallel combination, and are thus not independent of one another. As described above, an issue with a series-parallel combination is that any source mismatch may lead to significant loss of power in the network, as any parallel legs having sources with lower voltages may sink the power from other legs, and any shaded cell or module may reduce the output from a string of series-connected cells or modules. Further, another concern with the power conversion bridge circuit 1100 is that the photovoltaic module or solar cells are always ON, and thus present a safety hazard, as they are always outputting high voltages and/or have potential of a short circuit induced arcing.

Figure 1:
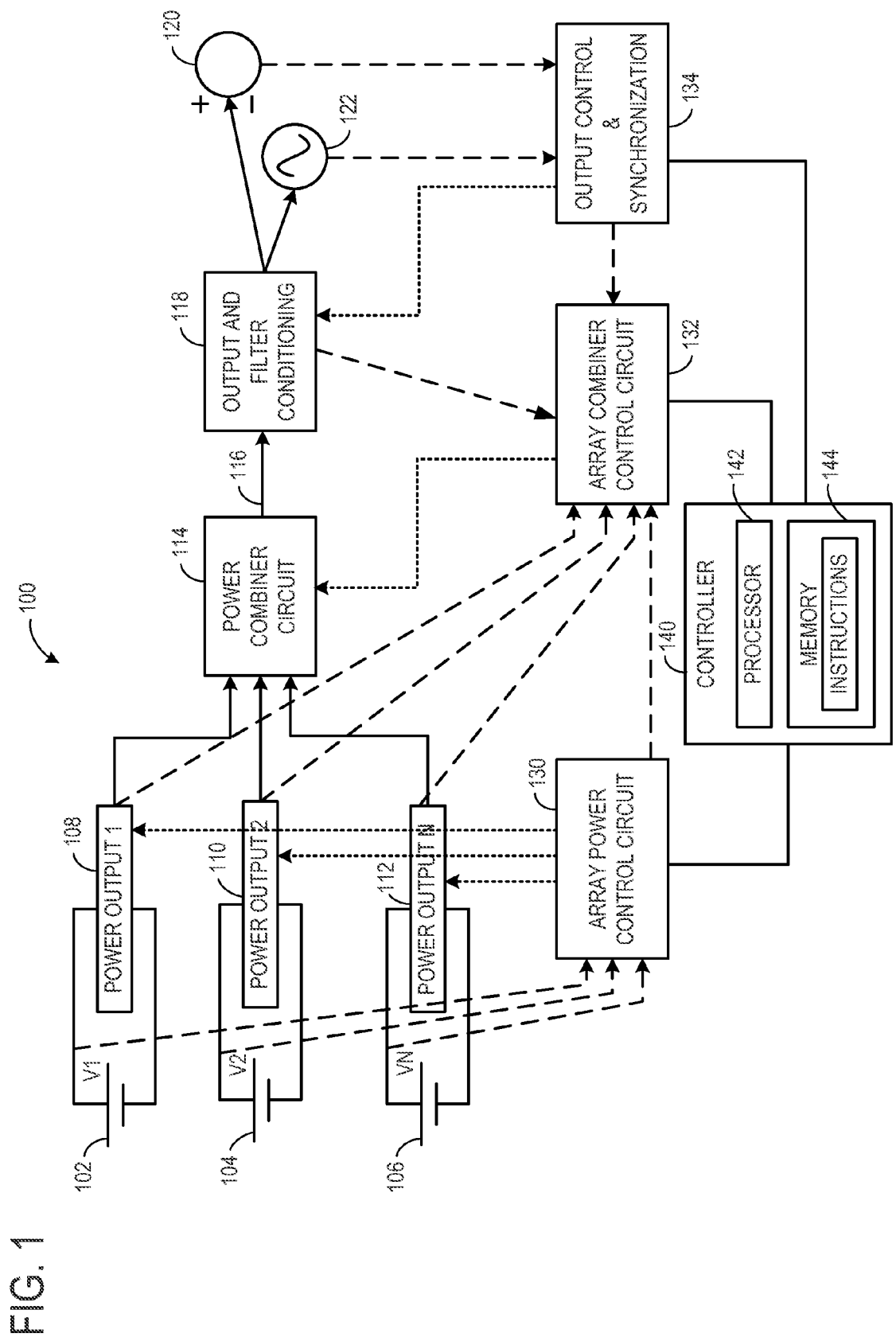
FIG. 1 shows a block diagram of an embodiment of a power conversion system.

Thus, embodiments are disclosed here that address at least these issues with the conversion of DC power into AC power. Further, the disclosed embodiments may be used with distributed and plural DC power sources, including but not limited to batteries, solar cells, supercapacitors, fuel cells, and other such distributed power generation sources. FIG. 1 shows an example embodiment of a power conversion system 100. Power conversion system 100 comprises a plurality of DC power sources, shown as DC power source 1 102, DC power source 2 104, and DC power source N 106, wherein N illustrates that any suitable number of DC power sources may be utilized. Each power source is electrically connected to a power output circuit. These are illustrated as power output 1 108, power output 2 110, and power output N 112. Where the DC power sources represent solar cells, each DC power source 102, 104, 106 may comprise a single solar cell, or multiple solar cells connected in series and/or parallel. Further, the DC power source may comprise a mix of battery, super-capacitors, solar cells, and/or fuel cells in various embodiments.

Power that is output by power outputs 108, 110 and 112 is directed to a power combiner 114, which combines the individual power outputs into a single combined power signal at 116. The combined power output signal may then be directed to an output stage 118, which may include waveform-generating circuits configured to generate a desired waveform from the combined power signal, as well as filters (e.g. for removing any undesired harmonic frequencies), matching networks, transformers, and/or other conditioning systems, such as a power grid synchronization system. Depending upon the specific configuration of the output and filter conditioning stage 118, the output may take the form of a DC signal 120 or an AC signal 122. Further, as described below, in some embodiments, power received from each of power output circuits by the power combiner may be substantially of a same polarity, thereby allowing source isolation and AC output formation without the use of a bridge circuit such as that shown in FIG. 11. The term "substantially of a same polarity" indicates that the power output by the power output circuits is not inverted with a bridge circuit to help produce a negative half-cycle of an AC signal, as is done with the circuit of FIG. 11.

The use of power outputs 108, 110, 112 to provide power from each DC power source 102, 104, 106 allows the flow of power from each power source to be individually controlled. In turn, this permits the use of embedded control logic or other control logic to be used to control and combine power that is output by power outputs 108, 110, 112 in such a manner as to efficiently provide desired power to a load. Examples of such logic are illustrated schematically in FIG. 1 as an array power control circuit 130, an array combiner control circuit 132, and an output control and synchronization circuit 134.

As depicted, the array power control circuit 130 is configured to monitor the output of each DC power source 102, 104, 106, and to control the output of power by power outputs 108, 110, 112 in response. In this manner, the amount of power provided by power outputs 108, 110, 112 to the power combiner 114 may be adjusted to compensate for any variation in the power produced by DC power sources 102, 104, 106. As a more specific example, where each DC power source 102, 104, 106 comprises one or more solar modules, a decrease in the output of one module due to cloud cover may be compensated by adjusting the operation of the power outputs. Further, the use of power outputs 108, 110, 112 allows each DC power source to be isolated from other DC power sources. This allows, for example, a DC power source that experiences a temporary decrease in power generation (e.g. due to cloud cover) to be electrically isolated from other DC power sources, and therefore may help to prevent sinking power into sources that are operating at lower power. It will be understood that the specific feedback and control connections for array power control circuit 130 are shown for the purpose of example and are not intended to be limiting in any manner, as the array power control circuit 130 may use any suitable information to control the power outputs 108, 110, 112.

The combiner control circuit 132 is depicted as monitoring the outputs of each power output 108, 110, 112, and as receiving feedback from the output and filter conditioning stage 118 and output control and synchronization circuit 134. Further, the combiner control circuit 132 also may receive feedforward from the array power control circuit 130 to obtain information regarding what outputs to expect from the individual power sources, and then use such information to correct for output power. With such feedback and feedforward information, the array combiner control circuit 132 controls the output of the power combiner circuit 114 in response. For example, the array combiner control circuit 132 may be configured to control various tunable components in the power combiner circuit 114. Such components may be adjusted to optimize the performance of the power combiner circuit 114 based upon such quantities as a frequency, magnitude, or other characteristic of an output signal received from each power output 108, 110, 112, and/or a characteristic of the performance of the output and filter conditioning stage 118, for example. It will be understood that the particular feedback and control connections to and from the array combiner control circuit 132 that are depicted in FIG. 1 are shown for the purpose of example and are not intended to be limiting in any manner, as the array combiner control circuit 132 may use any suitable inputs to control the combination of power signals received from power outputs 108, 110, 112.

The output control and synchronization circuit 134 is depicted as monitoring the output of the output and filter conditioning stage 118 (example outputs are depicted as DC output 120 and AC output 122), and providing feedback control to the output filter and conditioning stage 118. For example, the output control and synchronization circuit 134 may be configured to form a desired AC waveform, and to synchronize the output of the output and filter conditioning stage 118 to an external power grid. The output control and synchronization circuit 134 also may provide information to the array combiner control circuit 132 for control of the power combiner circuit 114. It will be understood that the particular feedback and control connections to and from the array combiner control circuit 134 depicted in FIG. 1 are shown for the purpose of example and are not intended to be limiting in any manner, as the array combiner control circuit 134 may use any suitable inputs to control the operation and output of the output and filter conditioning stage 118.

The array power control circuit 130, the array combiner control circuit 132, and the output control and synchronization circuit 134 each may include various logic components, and/or may be controlled by external logic. Such logic may reside locally, and/or may reside at a remote location accessible via a network (not shown). Such logic is represented in FIG. 1 collectively as a controller 140 that comprises a processor 142, and memory 144 comprising instructions executable to perform the various tasks related to the control of power conversion system 100. Such instructions may reside in computer-readable media such as non-transitory memory, examples of which include but are not limited to various types of RAM, ROM, and mass storage. Such instructions also may reside on a removable computer-readable medium, including but not limited to removable hard drive, DVD, CD-ROM, Flash memory drive and/or other such solid state memory, and/or any other suitable removable computer-readable media. While the controller 140 is depicted in FIG. 1 as a separate component from control circuits 130, 132 and 134, it will be understood that the control circuits 130, 132, 134 may be implemented partially or fully as executable instructions within controller 140.

The embedding of control logic with power sources as illustrated in FIG. 1 may enable information about the instantaneous condition of the power source to be used to adjust and modify the amount of power to be taken from each source and thus optimally from the array. In addition, the use of appropriate central logic may help to ensure the power flows in the array so as to maximize the efficiency of the overall array. Additionally, the separation of controlling the power flow from individual sources, from the combiner, and from the output control circuitry allows the array to be able to maximally transfer power to variety of loads, including AC and/or DC loads. Further, the use of power outputs connected to each DC power source allows power from the DC sources to be completely turned off when desired or required. This may enable safe handling and storage of the DC power sources 102, 104, 106 as the output may be configured not to carry any high voltages or present a risk of arcing.

The embodiment of FIG. 1 also may be used as a charge controller for a battery bank. In this case, the power conversion system 100 may be used as an inverter for AC loads as well as a charge controller for a battery bank that could be utilized to supply power to AC loads when solar power is unavailable, and/or to supplement solar power when it is insufficient to run such AC loads.

Figure 2:
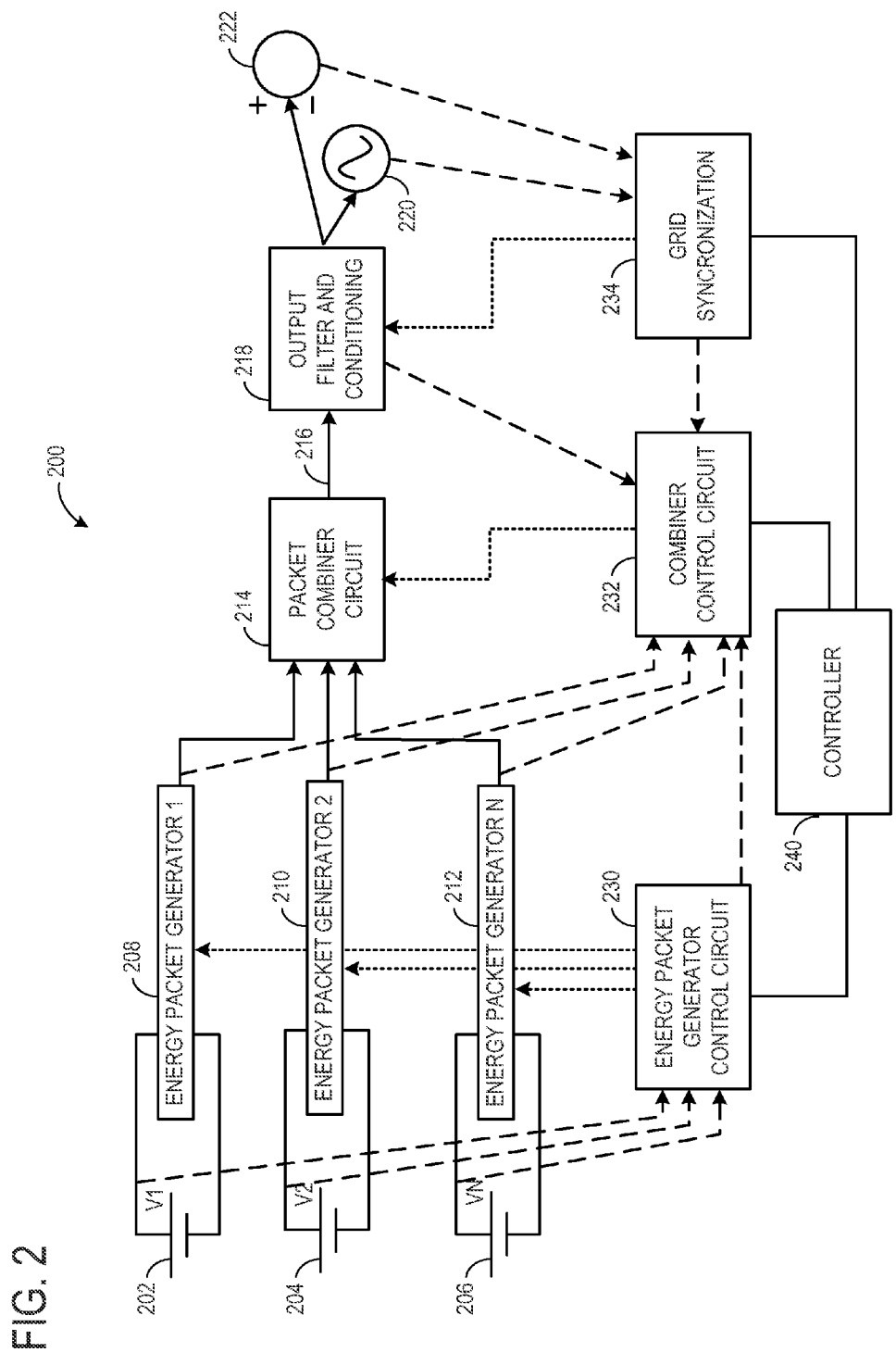
FIG. 2 shows a block diagram of another embodiment of a power conversion system.

The power outputs 108, 110, 112 may be configured to output any suitable signal to the power combiner circuit 114, and may include any suitable components. For example, in some embodiments, the power outputs may be configured to generate energy packets for combination into a desired waveform. FIG. 2 depicts an example of an embodiment of a power converter 200 configured to utilize the generation of energy packets for combination into a desired output signal. The terms "energy packet" and "electrical energy packet" as used herein represents a discrete output of energy such that the power output is non-zero for a duration and zero for a duration that is greater than a mere crossing of a zero voltage during a rising or falling transition. The duration of zero output from one energy packet generator may occur, for example, while another energy packet generator is currently providing a non-zero output. This may allow isolation of one DC power source from another that is connected in a parallel arrangement via energy packet generators.

Power converter 200 is shown as comprising an arbitrary number N of DC power sources, illustrated as $V_1$ 202, $V_2$ 204, and $V_N$ 206. Further, power converter 200 also comprises an energy packet generator corresponding to each DC power source. These are illustrated as energy packet generators 208, 210 and 212, which respectively correspond to DC power sources 202, 204 and 206. Each energy packet generator, as described in more detail below, is configured to selectively generate an electrical energy packet for provision to an energy packet combiner, which is configured to receive electrical energy packets from the plurality of energy packet generators and to combine the electrical energy packets into a combined energy packet signal for production of an output signal by an output stage.

The use of energy packet generators 208, 210 and 212 allows each DC power source 202, 204, 206 to be isolated from the other DC power sources, yet to achieve the output power of a parallel arrangement. This may allow a desired output power to be achieved, while also avoiding sinking power into any DC power source that is operating at a lower power level than others. Further, where one or more DC power sources are not operating at a desired power level, the energy packet generator control circuit may compensate by adjusting the operation of the energy packet generators 208, 210, 212 to optimize the power that is input into the packet combiner circuit 214 based upon the current state and capabilities of the DC power sources 202, 204, 206.

The energy packet combiner circuit 214 may be configured to combine the energy packets in any suitable manner to provide a desired output. For example, in the case where it is desired to output an AC signal, the energy packet combiner circuit 214 may combine energy packets from each energy packet generator into a combined energy packet signal for provision to an oscillating circuit. The combined energy packet signal may have a frequency of energy packets, or a range of frequencies (spread spectrum), configured to drive oscillation of the circuit to produce a desired output Likewise, a width of the energy packets may be modulated to achieve a desired AC output. As a more specific example, where an AC output is desired, the energy packet combiner circuit 214 may be configured to produce a combined energy packet signal for provision to an LC tank circuit with a resonant frequency that is matched to a frequency of a power grid 220 to which the power converter is coupled, or matched to a harmonic of the grid whereby the resonant frequency of the circuit is an integral multiple of the power line frequency. Due to the impedance characteristics of an LC tank circuit at its resonant frequency, power from DC power sources 202, 204, 206 may be efficiently provided to a load compared to the circuit of FIG. 11. It will be understood that the term "matched to a frequency" and the like as used herein may refer to any suitable frequency configured to cause a desired response in an oscillating circuit, and encompasses frequencies matched to fundamental frequencies as well as harmonic frequencies. As non-limiting examples, the frequency may be double or ten times the power line frequency, or may be any other suitable integral multiple of the grid frequency.

More generally, in some embodiments, the frequency of energy packets emitted from each energy packet generator may be some integer L times the resonant frequency of the oscillating circuit, as each energy packet generator may generate L energy packets in one cycle. Likewise, the resonant frequency of the oscillating circuit may be m integer times the grid frequency. Thus, if there are N energy packet generators configured to emit electrical energy packets in a staggered timing in one resonant cycle, then the width of each energy packet may be, for example, 1/(resonant frequency*L*N)=1/(grid frequency*m*N*L).

A combiner control circuit 232 and a grid synchronization circuit 234 may be used to control the frequency, phase, and/or other characteristics of the output of the power converter 200. Further, as described above in the context of FIG. 1, the power conversion system may comprise logic, represented as controller 240, in electrical communication with each energy packet generator and the energy packet combiner to control the generation and combination of electrical energy packets.

Any suitable circuitry may be used to control the generation and combination of energy packets. For example, some embodiments may employ a switched network of elements including capacitors, inductors, resistors, and switches to convert power from an array of DC sources into energy packets, and to combine the energy packets into a desired output.

Figure 3:
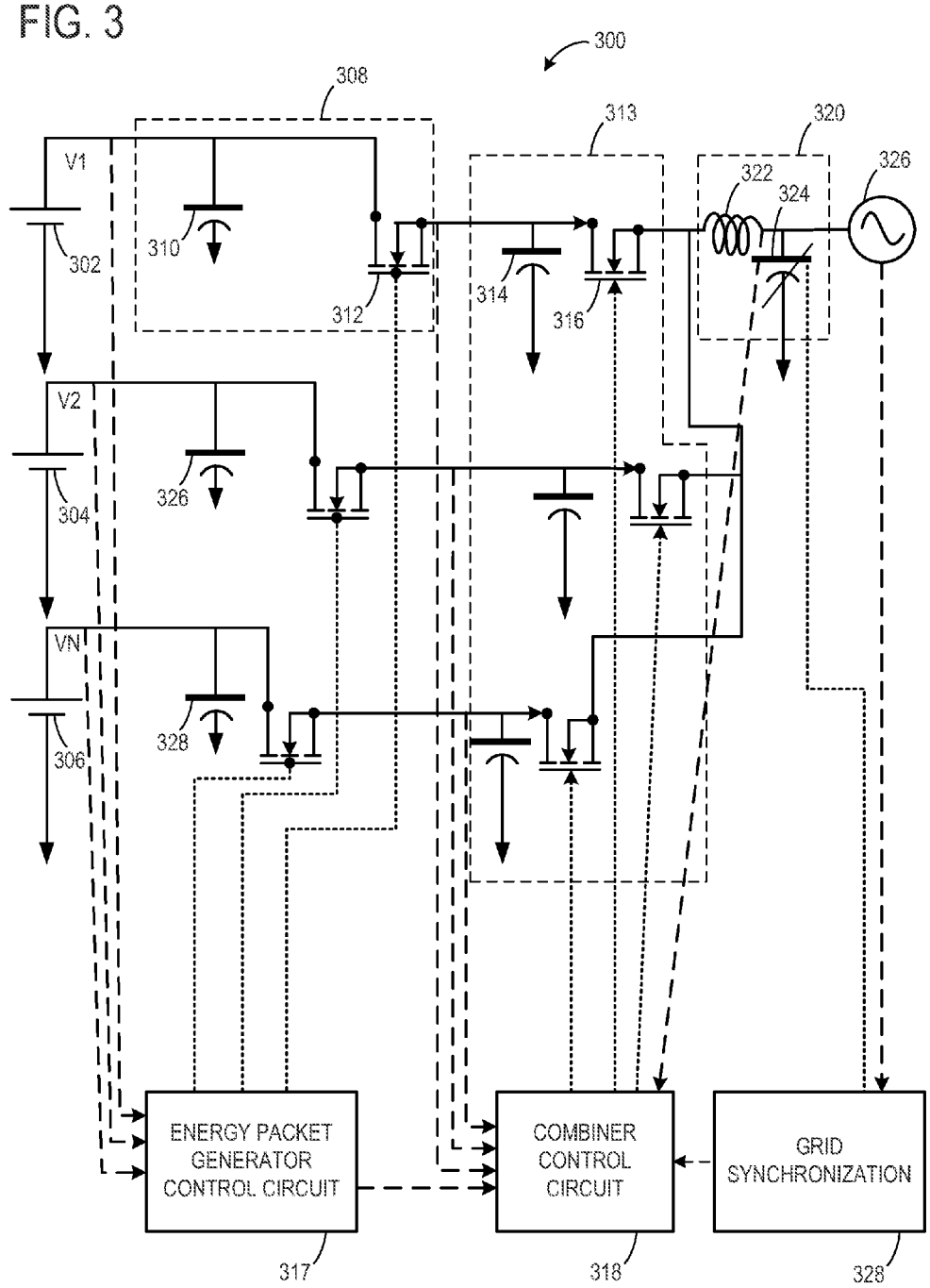
FIG. 3 shows a schematic diagram of an embodiment of a power conversion system that comprises an energy packet generator for each of a plurality of DC sources.

FIG. 3 shows an embodiment of a power converter 300 comprising such a switched network of elements. Power converter 300 is shown as comprising an arbitrary number N of DC power sources (illustrated as $V_1$ 302, $V_2$ 304, and $V_N$ 306). Further, power converter 300 also comprises an energy packet generator corresponding to each DC power source, one of which is shown at 308 as including an initial energy storage stage 310 and a first switching stage 312. Additionally, power converter 300 comprises an energy packet combiner 313 that includes, for each DC power source 302, 304, 306, an intermediate energy storage stage 314 located between the first switching stage 312 and a second switching stage 316.

The initial energy storage stage 310 and the intermediate energy storage stage 314 are depicted as capacitors in FIG. 3, but it will be understood that any other suitable energy storage mechanism may be used, including but not limited to inductors and LC circuits. Likewise, first switching stage 312 and second switching stage 316 are each depicted as MOSFETs in FIG. 3, but it will be understood that any other suitable switching mechanism may be used. Examples include, but are not limited to, other FETs, bipolar junction transistors, thyristors, gate controlled thyristors, silicon controlled rectifiers, and/or other electronic switching devices.

The first switching stage 312 and the second switching stage 316 are respectively electrically connected to the energy packet generator control circuit 317 and an energy packet combiner control circuit 318 (which, as described above, may reside on a single controller or on separate controllers). The energy packet generator control circuit 317 and energy packet combiner control circuit 318 are configured control a sequence of the opening and closing of the first switching stage 312 and second switching stage 316 for each DC power source.

Figure 4:
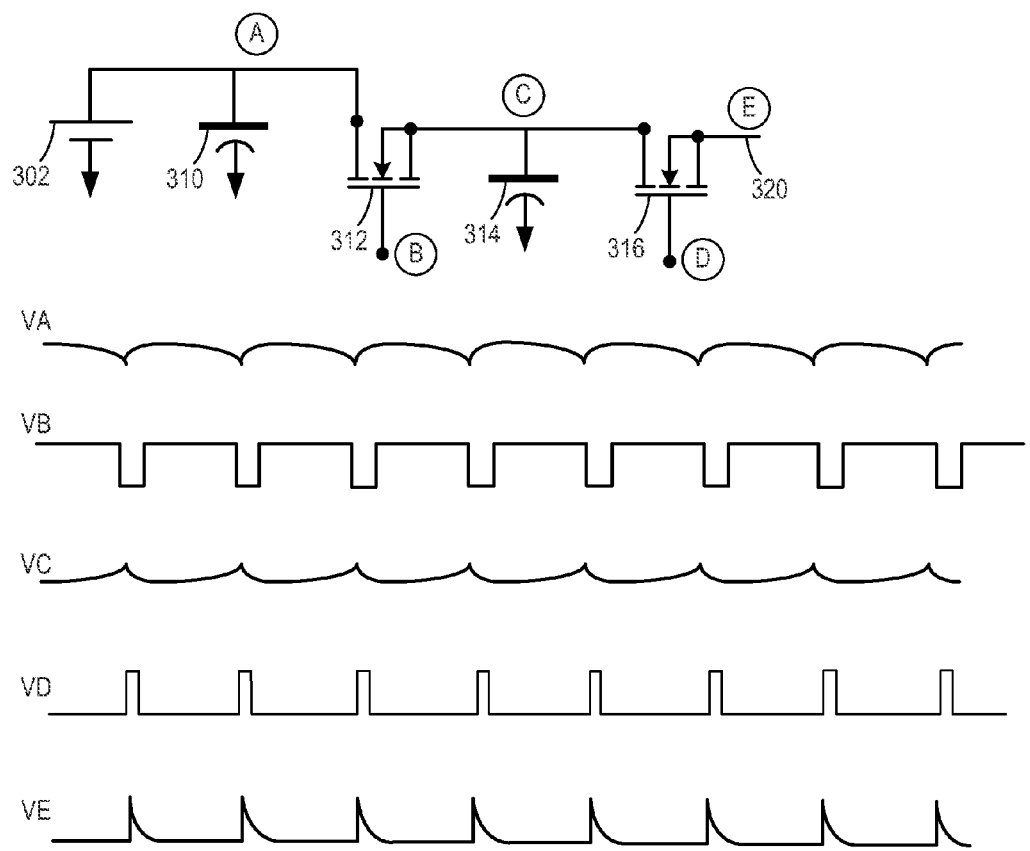
FIG. 4 shows embodiments of an energy packet generator circuit and a portion of a combiner circuit, and also shows a timing diagram illustrating voltages at designated points in the circuit as a function of time according to an embodiment of a method of operating the circuit.

FIG. 4 shows a timing diagram that illustrates an embodiment of a method for controlling the opening and closing of the first switching stage 312 and the second switching stage 316 to produce an output signal comprising a plurality of temporally spaced energy packets. Generally, according to the embodiment of FIG. 4, for each DC power source, the first switching stage 312 and second switching stage 316 are operated in a first energy packet production phase in which the first switching stage 312 is in a closed state and the second switching stage 316 is in an open state to pass charge from the DC power source 302 to the intermediate charge storage stage 314. Then, the first and second switching stages are operated in a second energy packet production phase in which the first switching stage 312 is in an open state and the second switching stage 316 is in a closed state to discharge an electrical energy packet that is combined with energy packets from other energy packet generators to form a combined energy packet signal for the output stage 320. In this manner, the output stage 320 is electrically isolated from the DC power source 302 throughout operation. Further, by sequencing this operation for each of the plurality of DC power sources, each DC power source may be made independent from the other DC power sources so that a source that is operating at a lower power output will not sink current from other DC power sources.

The nature of this operation can be seen via the timing diagrams illustrated in FIG. 4, which show voltages in the depicted circuit as a function of time. The voltage at point A in the circuit (the initial energy storage stage) is shown as $V_A$, the voltage at point B (the gate of the first switching stage) as $V_B$, the voltage at point C (the intermediate energy storage stage) as $V_C$, the voltage at point D (the gate of the second switching stage) as $V_D$, and the voltage at point E (the output of the energy pulse combiner stage) as $V_E$.

First, the DC power source 302 provides current that is output to the initial energy storage stage 310. The sequence of transfer of energy is controlled by controlling the first and second switching stages via control pulses applied at points B and D to transfer the energy from the DC power source 302 to the output stage 320, and thus to a load. $V_B$ and $V_D$ illustrate a repetitive, time delay switching between control pulses at the first switching stage 312 and the second switching stage 316, respectively. It can be seen that, in the initial state of the timing diagram 400, a low logic state is applied to the second switching stage 316 while a high logic state is applied to the first switching stage 312. Thus, the second switching stage 316 is in an open state while charge is transferred through the first switching stage 312 to the intermediate energy storage stage 314. Thus, it further can be seen that, during this phase of operation, the voltage at the initial energy storage stage 310 ($V_A$) decreases while the voltage at the intermediate energy storage stage 314 ($V_C$) increases. Also, the voltage $V_E$ at the output of the second switching stage 316 remains low during this phase of operation.

Next, referring again to $V_B$ and $V_D$, it can be seen that $V_B$ is periodically reduced to logic low, thereby opening the first switching stage 312. Then, $V_D$ is pulsed to logic high, thereby closing the second switching stage 316 and thus producing an energy packet at the output of the second switching stage 316, as shown at $V_E$. A delay may be used between the opening of the first switching stage 312 and the closing of the second switching stage 316. In the depicted embodiment, $V_D$ is pulsed to logic high for a relatively narrow window, thereby leading to the creation of an output energy packet which is narrow and sharp. Examples of suitable ranges for the width of the energy packet include, but are not limited to, widths in a range of 10 nanoseconds to 5 milliseconds. Likewise, examples of suitable frequencies of energy packets in the combined energy packet signal include, but are not limited to, frequencies within a range of 100 Hz to greater than 100 MHz. It will be understood these ranges are presented for the purpose of example, and that an energy packet may have any other suitable shape and width, and that a combined energy packet signal may have any other suitable frequency or frequencies. Further, it will be understood that the combined energy packet signal frequency or frequencies, and/or the energy packet width, may be variable over time as the energy packet generators and/or combiner are adjusted based upon current DC power source output characteristics to help achieve desired output efficiencies.

By utilizing a delay between the opening of the first switching stage 312 and the closing of the second switching stage 316, the DC power sources are insulated from a load. Further, operating the first and second switching stages as depicted in FIG. 4 may allow the DC power source 302 source to remain balanced, as the second switching element connects the load only for a window and transfers the most electrical energy in the form of a pulse. For example, maintaining DC power source 302 connected to the initial energy storage stage 310 at all times serves to balance the DC power source 302, as initial energy storage stage 310 helps to smooth variation in effective loading and thereby help to establish reliable and efficient functioning of the DC power source 302.

In the depicted embodiment, the window for connecting the initial energy storage stage 314 to the intermediate energy storage stage 314 is controlled by the width of the high logic stages in the $V_B$ timing diagram. In this embodiment, this window is kept relatively wide, and may range in width from, for example, 10 nanosecond to 10 milliseconds, depending on the frequency of the combined energy packet signal. For example, where a power line has a frequency of 50 or 60 Hz, the first switching stage may be controlled with a pulse width of approximately 10 ms, while higher frequency of 100 MHz may utilize pulses of approximately 10 ns widths. Such AC pulses may essentially have a duty cycle value of between 0.5 to 0.999999, thereby leading to the DC power source 302 being connected to the initial energy storage stage 310 and the intermediate energy storage stage 314 for a majority of time.

During this time any energy output by DC power source 302 is being stored in initial energy storage stage 310 and intermediate energy storage stage 314. Next, when $V_B$ pulses low to open the first switching stage 312, the intermediate energy storage stage 314 is no longer connected to the DC power source 302, while the initial energy storage stage 310 continues to be connected to the DC power source 302. During this time the initial energy storage stage 310 is being fed the energy from DC power source 302 and continues to store it. Next, the logic high pulse of $V_D$ connects the intermediate energy storage stage 314 to an output load via the second switching stage 316. The intermediate energy storage stage 314 then transfers its stored energy to the output load. This discharging of the intermediate energy storage stage 314 is then stopped when the second switching stage opens (e.g. when $V_D$ transitions to logic low). This leads to the load being insulated and stops any discharging of the second energy storage stage 314. With the repetition of the cycle where the DC power source 302 and the initial energy storage stage 310 are connected to the intermediate energy storage stage 314, the energy lost by the intermediate energy storage stage 314 is replenished. In this manner, the cycle continues with the repeating transfer of energy. It will be understood that the embodiment of FIG. 4 is presented for the purpose of example, and is not intended to be limiting in any manner, as any other suitable pulse timing may be used to control the first switching stage 312 and the second switching stage 316.

The initial energy storage stage 310 may be configured to have any suitable energy storage capacity. For example, in some embodiments, in order to balance the DC power source 302, the initial energy storage stage 310 may be configured to drain 10% or less of stored charge while the first switching stage 312 is closed, as this may help to maintain balance of the DC power source 302. In other embodiments, the initial energy storage stage 310 may have any other suitable energy storage characteristics. Likewise, the intermediate energy storage stage 314 also may have any suitable energy storage characteristics. For example, the intermediate energy storage stage may be configured to have sufficient storage capability to allow the isolation of the DC power source 302 from the output and provide the desired higher power capability for instantaneous pulsing out of large amounts of energy.

Figure 5:
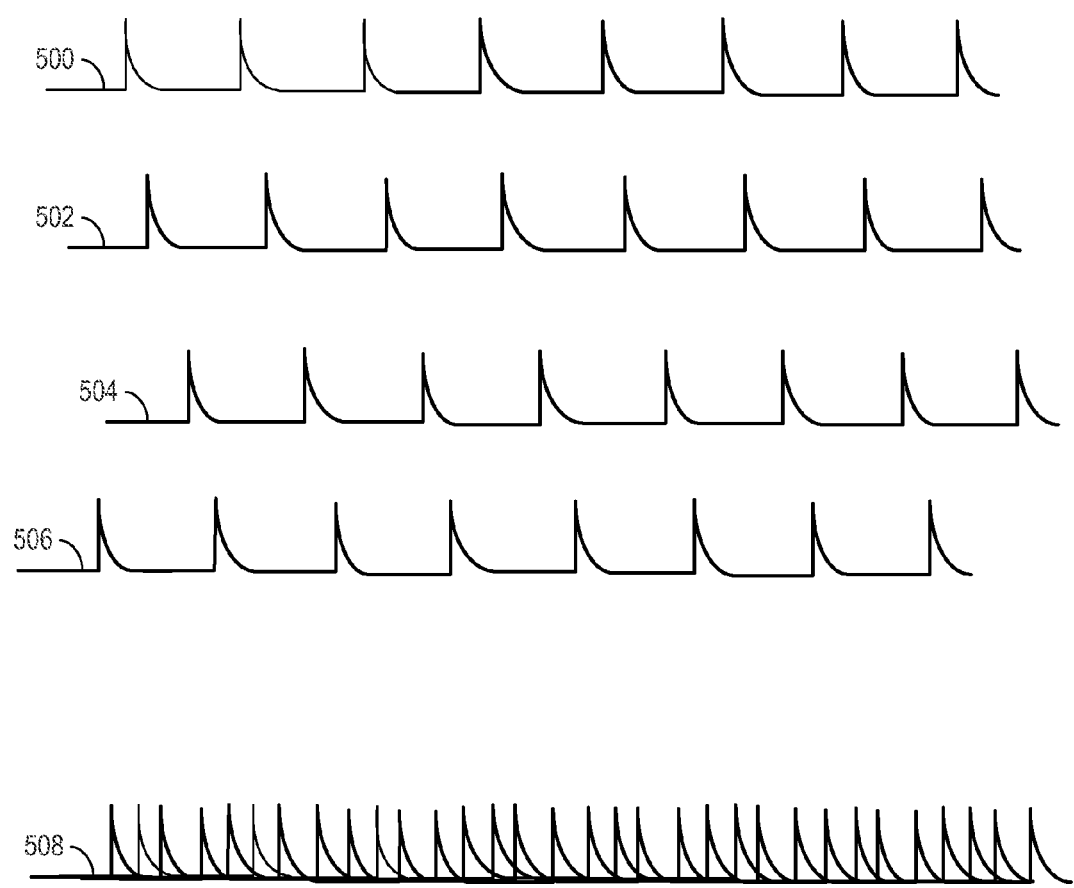
FIG. 5 shows an embodiment of a combined energy packet signal prior to shaping to produce an output signal.
Figure 6:
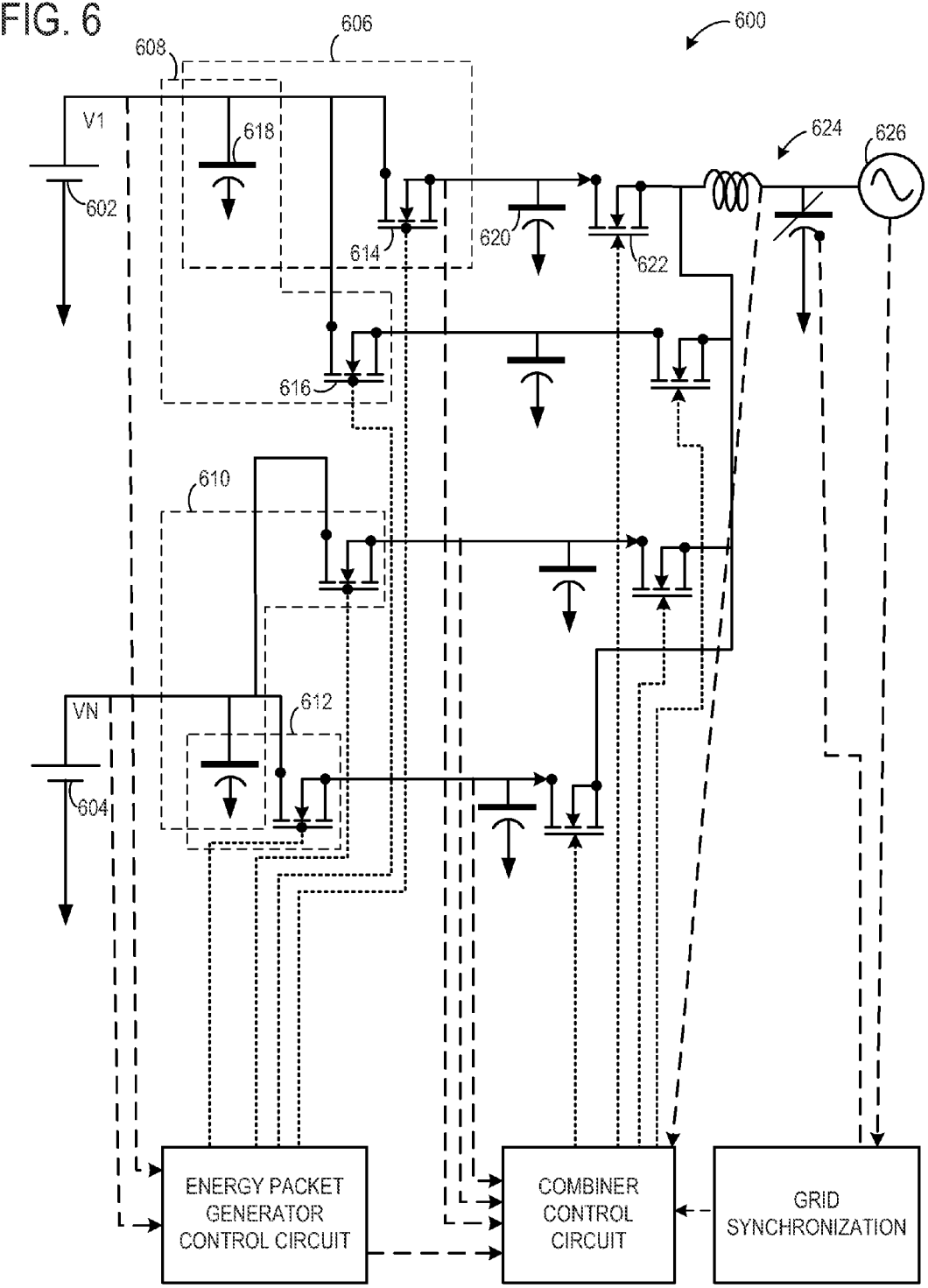
FIG. 6 shows a schematic diagram of an embodiment of a power conversion system that comprises a plurality of energy packet generators for each of a plurality of DC sources.
Figure 7:
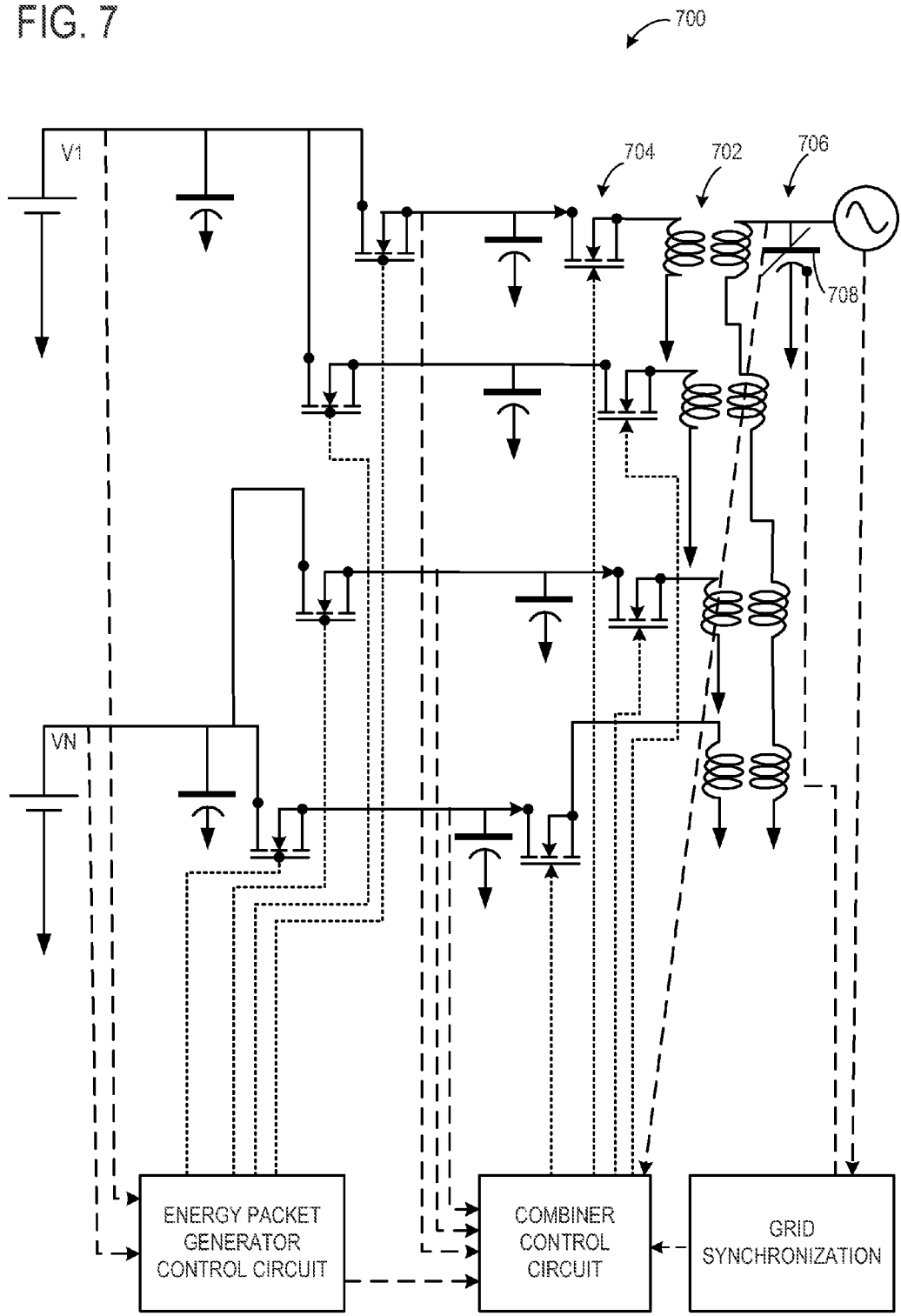
FIG. 7 shows a schematic diagram of an embodiment of a power conversion system that comprises an output stage having a plurality of transformers.

FIG. 5 illustrates an embodiment of a method of sequencing an energy packet generation timing for four energy packet signals 500, 502, 504, 506 produced via four energy packet generators (such as depicted in FIGS. 6 and 7, described in more detail below). It will be understood that the concepts illustrated in this figure may be extended to any suitable number of energy packet generators. The energy packets from each energy packet generator are temporally staggered such that a combined energy packet signal 508 formed from the combination of each individual energy packet signal comprises a frequency approximately N times higher than the frequency of any individual energy packet signal, wherein N is the number of energy packet generators. The combined energy packet signal 508 may have any suitable energy packet frequency. Suitable frequencies include those that are configured to produce a desired output signal in a downstream output stage.

As a more specific example, the combined energy packet signal may have a frequency matched to a resonant frequency of an oscillating circuit, such as a tank circuit, to thereby create an alternating current waveform output via the tank circuit. The resonant frequency (F001) of the tank circuit determines the frequency of each combined energy packet signal pulse train (F002) which may, for example, be either approximately equal to or be an integral multiple of the resonant frequency. In other words, F002=F001, or F002=n*F001 where n is an integer 1, 2 3 . . . .

Thus, if there are N independent sources and when the frequency F002 equals F001, the pulse width PW of each source (i.e. the width of the energy packet from each source) is narrower than 1/(F002*N).

As a more specific example, for a resonant circuit working at 50 Hz (i.e. matched to a 50 Hz power line), and where 100 energy packet generators are connected together, the pulse width for would be 19 microseconds for the wide pulse that controls the first switching stage, and 1 microsecond for the narrow pulse that controls the second switching stage.

As another more specific example, the combined pulse signal may be configured to produce a desired DC signal via an RC circuit or other suitable circuit.

Returning briefly to FIG. 3, an example output circuit is shown at 320 as an oscillating circuit in the form of an LC tank circuit comprising an inductor 322 and a capacitor 324. In the depicted embodiment, the capacitor is depicted as being tunable. In other embodiments, the inductor may be tunable, and/or the capacitor may have a fixed value. Further, an output circuit also may have other components not shown in FIG. 3.

The LC tank circuit formed by inductor 322 and capacitor 324 is configured to be excited by the combined energy packet signal received from energy packet combiner 313 to cause oscillation at a resonant frequency, thereby forming an AC waveform 326. Thus, the values of C and L for the capacitor 324 and inductor 322 may be selected to resonate at a desired frequency, such as at a frequency or harmonic of a power grid to which the power converter 300 is connected. Additionally, an AC grid synchronization circuit 328 may be provided to synchronize the alternating current waveform from the output stage with a local electrical grid. It will be understood that any other suitable oscillating circuit than the depicted LC circuit may be used to produce the AC waveform output. It further will be understood that the LC tank circuit may be connected to a load with appropriate filtering, transformers, matching subsystems, etc., that are not shown herein.

The operation of the embodiment of FIG. 3 according to the methods depicted in FIGS. 4 and 5 to generation time-displaced combinations of energy packets may lead to transfer of essentially all the power from the distributed DC power sources in a manner to pump the tank circuit with appropriate excitation pulses to transfer out a large quantity of power. The pulse generation sequence and the switching sequence are controlled using the energy packet generator control circuit and energy packet combiner control circuit. Further, feedback may be utilized from the output to allow the controller circuits to be programmed to synchronize with a grid, to track load requirements, and/or change the output as needed.

In the embodiment of FIG. 3, each DC power source is connected to one corresponding energy packet generator. However, in other embodiments, each DC power source may be connected to a corresponding plurality of energy packet generators. For example, FIG. 6 shows an embodiment of a power converter 600 in which each DC power source (shown as DC power sources $V_1$ 602 and $V_N$ 604) provides power to two corresponding energy packet generators. These are illustrated as energy packet generators 606 and 608 corresponding to power source 602, and energy packet generators 610 and 612 corresponding to power source 604. As depicted, energy packet generators 606 and 608 utilize separate first switching stages (shown at 614 and 616, respectively), but share a common initial energy storage stage 618 (which may represent one or more capacitors, inductors, etc.). Energy packet generators 610 and 612 also utilize separate first switching stages and a common initial energy storage stage.

The four depicted energy packet generators 606, 608, 610, 612 are each connected to a corresponding intermediate energy storage stage and second switching stage, as represented by second energy storage stage 620 and second switching stage 622. A combined energy packet signal from the four energy packet generators is then provided to an output stage, such as the depicted LC tank circuit 624 to provide an AC output. In other embodiments, the combined energy packet signal may be provided to an output stage configured to form a voltage-controlled DC output, or any other suitable output.

FIG. 7 depicts an embodiment of a power converter 700 that is similar to that of FIG. 6 in that power converter 700 comprise two energy packet generators for each DC power source. However, power converter 700 utilizes transformers 702 to isolate each second switching stage 704 from the output stage 706. The transformers 702 also act as inductors to form a tank circuit with capacitor 708. Thus, as depicted, each transformer 702 comprises a first coil connected to a corresponding second switching stage 704, and a second coil that, in combination with the second coils of other transformers, forms the tank circuit with the capacitor 708.

The use of a plurality of energy packet generators connected to each DC power source allows the DC power source to continually provide output, and also further isolates the DC power sources from potential fluctuations at the output. Further, with the appropriate controlling of switching such that each transfer function is mutually exclusive of the other, the overall loading on the DC power sources may be balanced, and such balancing may be better controlled with a greater number of connected transfer switches. Yet another advantage of the embodiments of FIGS. 6 and 7 is that the requirement for energy storage stages may be reduced, as the overall load is balanced on the sources via appropriate sequence controls. While the embodiments of FIGS. 6 and 7 show two energy packet generators connected to each DC power source, it will be understood that any suitable number of energy packet generators, such as 3 or more in some embodiments, may be connected to a DC power source.

Figure 8:
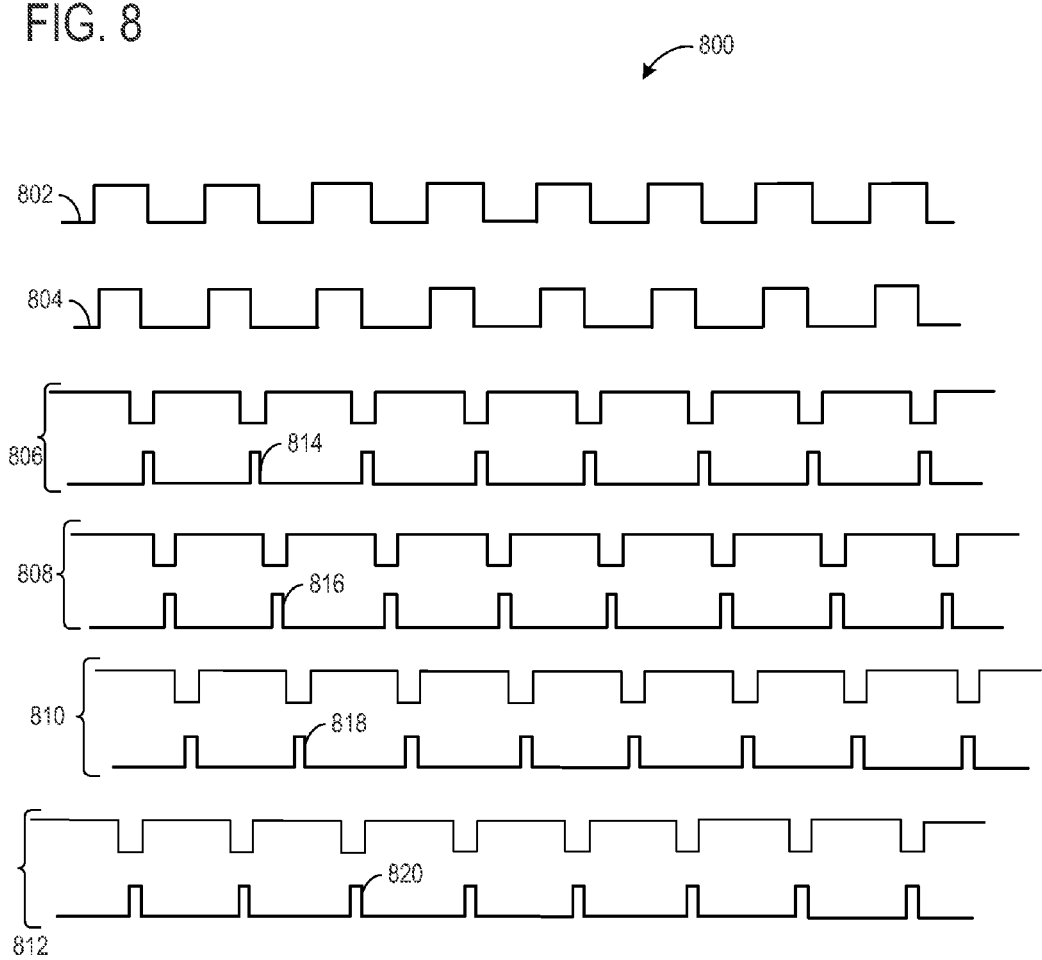
FIG. 8 shows an embodiment of a pulse sequence that may be used to operate the embodiments of FIGS. 6 and 7.

FIG. 8 shows an embodiment of a timing diagram 800 illustrating pulse sequences suitable for controlling the embodiments of FIGS. 6 and 7 to produce, for example, the combined energy packet signal shown at 508 in FIG. 5. First, FIG. 8 illustrates two control signals, at 802 and 804, that may be used to produce the pulse patterns applied to each first switching stage and second switching stage. The pulse patterns applied to each first and second switching stage are shown for the four depicted energy packet generators at 806, 808, 810, and 812. In these pulse patterns, the top pulse pattern may be applied to the first switching stage, while the bottom pulse pattern may be applied to the second switching stage. It will be noted that the pulse patterns 806, 808, 810 and 812 are temporally shifted relative to one another to thus form a desired pattern of energy packets for combination. In the depicted embodiment, the pulses 814, 816, 818, 820 for each second switching stage are temporally non-overlapping, such that the resulting energy packets are substantially non-overlapping. However, in other embodiments, the pulse patterns may be configured to create at least some overlap between energy packets. It will be understood that the relative timing and pulse width for each pulse pattern may be controlled via feedback obtained by monitoring the power converter output, each DC power source, and/or any other suitable quantities.

FIG. 9 illustrates another embodiment of a power converter 900. Power converter 900 is similar to power converter 300 of FIG. 3 in that each DC power source is connected to one corresponding energy packet generator. However, the output stage for the power converter 900 is configured to produce a DC output, rather than an AC output. As such, power converter 900 comprises a capacitive stage, represented by capacitor 902, instead of an LC tank circuit, as an output stage. The capacitor 902 may combine with resistive elements in the circuit (not shown) to form an RC circuit with a time constant sufficient to produce a DC output 904 from an input of a combined energy packet signal such as that shown at 508 in FIG. 5. The capacitor 902 is shown as being variable, but a capacitor of fixed value also may be used. It will be understood that other components not shown may be used to smooth any ripple and further filter the DC output. Further, it will be understood that some embodiments may be configured to selectively output both DC and AC signals, as illustrated in FIGS. 1-2.

Figure 10:
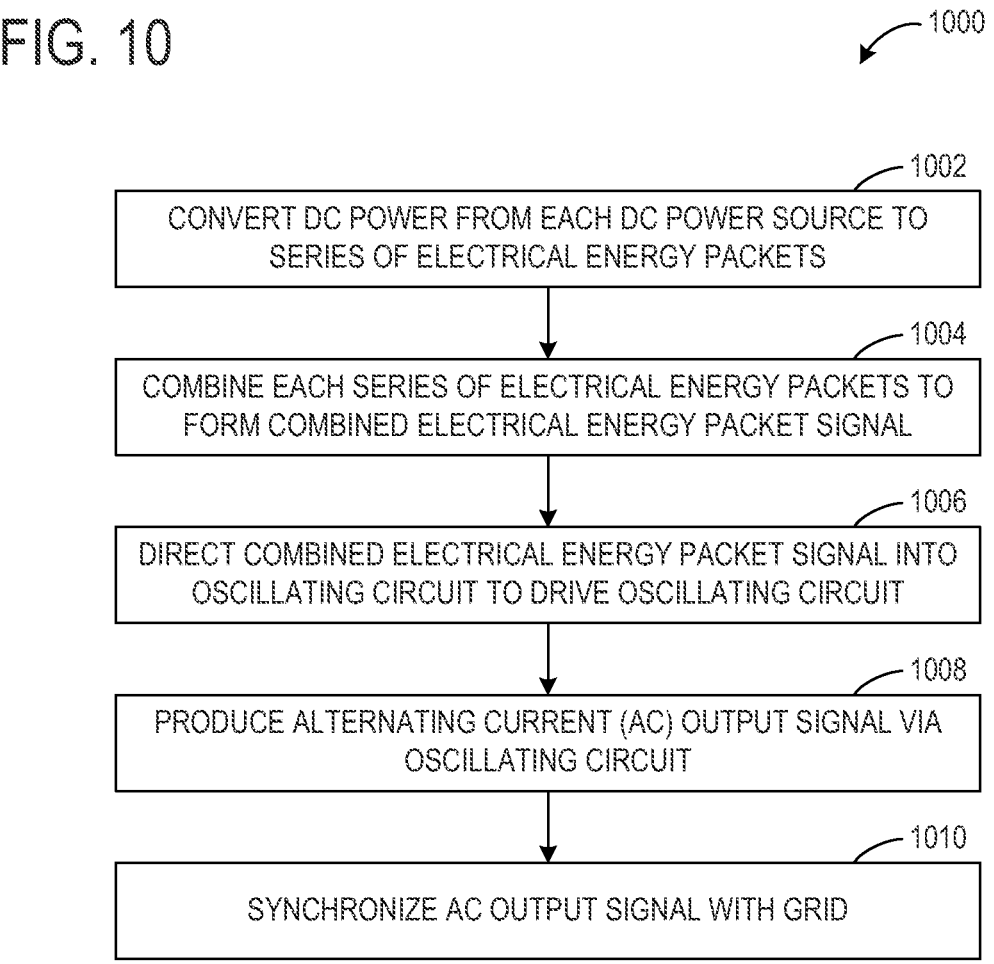
FIG. 10 shows a flow diagram depicting an embodiment of a method for converting DC power from a plurality of DC power sources.

FIG. 10 shows an embodiment of a method 1000 for converting power from an array of direct current power sources to alternating current power. Method 1000 comprises, at 1002, converting DC power from each DC power source to a series of electrical energy packets, and then at 1004, combining the series of electrical energy packets from each DC power source to form a combined electrical energy packet signal. The generation and combination of energy packets may be performed in any suitable manner, including but not limited to those discussed above with reference to the embodiments of FIGS. 1-9. Further, as described above, the combined energy packet signal may have any suitable frequency, and the energy packets may have any suitable width and magnitude, depending upon a desired output signal to be formed. Next, at 1006, method 1000 comprises directing the combined electrical energy packet signal into an oscillating circuit to drive the oscillating circuit, and at 1008, producing an alternating current (AC) output signal via the oscillating circuit. In some embodiments, as illustrated at 1010, the AC output signal may be synchronized with a power grid. It will be understood that a similar method may be used to produce a DC output signal, except that an RC circuit may be used in place of a tank circuit to convert the combined electrical energy packet signal into a DC signal.

Any suitable circuit oscillating circuit may be used to produce an AC waveform. For example, in some embodiments as described above, a tank circuit comprising inductive and capacitive components may be used to convert a combined energy packet signal into a sinusoidal output signal. In such embodiments, a frequency of the energy packets in the combined energy packet signal may have a frequency matched to a resonant frequency of the oscillating circuit, or may have any other suitable frequency.

Likewise, any suitable method may be used to produce the electrical energy packets. For example, as described above, converting DC power from each DC power source to a series of electrical energy packets may comprise, for each DC power source, operating a first switching stage in a closed state while operating a second switching stage in an open state thereby charging an intermediate charge storage stage located between the first switching stage and the second switching stage, and then operating the second switching stage in a closed state while operating the first switching stage in an open state to release an electrical energy packet from the intermediate storage stage. Further, charging the intermediate charge storage stage may comprise transferring electrical charge from an initial charge storage stage to the intermediate storage stage while the first switching stage is in the closed state.

Via the above-described embodiments, power may be provided from each source controlled by each energy packet generator in a manner as to provide suitable timing and magnitude of the energy packets. Further, the generated energy packets may be combined in such a manner as to optimally collect and transfer the power. Additionally, the energy combiner circuitry may be variably and programmatically controlled as to combine the pulses in a manner to provide suitable output characteristics. The same combiner methodology can be used to provide and output which is voltage controlled DC, or AC that can have the magnitude and frequency independently controlled. Selection of an appropriate combination of energy packets may allow the energy packet generator and energy packet combiner control circuits to produce any suitable output characteristics. It will be understood that output shaping filtering and control circuitry may be used to stabilize the output waveform and remove any noise and/or unwanted distortion or harmonics. It will further be understood that feedback from either from the grid or load may be used to modify the control signals to help to maintain a desired efficiency and performance.

It is to be understood that the configurations and/or approaches described herein are presented for the purpose of example, and that these specific embodiments are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A power conversion system, comprising:
a plurality of direct current (DC) power sources;
a plurality of energy packet generators, each energy packet generator being connected to a corresponding DC power source to receive power from the corresponding DC power source and to selectively generate an electrical energy packet, and each energy packet generator comprising a first switching stage in electrical communication with the corresponding DC power source;
an energy packet combiner configured to combine electrical energy packets from the plurality of energy packet generators;
a second switching stage located electrically between the first switching stage and the energy packet combiner;
an intermediate charge storage stage located between the first switching stage and the second switching stage; and
a controller in electrical communication with each energy packet generator and the energy packet combiner to control the generation and combination of electrical energy packets.

2. The power conversion system of claim 1, wherein each DC power source comprises one or more solar cells.

3. The power conversion system of claim 1, wherein each DC power source comprises one or more of a battery, a supercapacitor, and a fuel cell.

4. The power conversion system of claim 1, wherein each energy packet generator further comprises an initial charge storage stage located electrically between the first switching stage and the corresponding DC power source.

5. The power conversion system of claim 1, further comprising an output stage, and wherein, for each DC power source, the controller is configured to operate the first switching stage and the second switching stage in a first energy packet production phase in which the first switching stage is closed and the second switching stage is open to charge the intermediate charge storage stage, and then to operate the first switching stage and the second switching stage in a second energy packet production phase in which the first switching stage is open and the second switching stage is closed to emit an electrical energy packet to the output stage.

6. The power conversion system of claim 5, wherein each energy packet generator further comprises an initial charge storage stage disposed electrically between the first switching stage and the corresponding DC power source, and wherein the initial charge storage stage comprises a capacitor configured to drain 10% or less of stored charge during the first energy packet production phase.

7. The power conversion system of claim 5, wherein the controller is configured to sequence an energy packet generation timing for the plurality of energy packet generators.

8. The power conversion system of claim 1, wherein each DC power source is connected to a corresponding plurality of energy packet generators each having an intermediate charge storage stage.

9. The power conversion system of claim 1, further comprising an output stage comprising an oscillating circuit configured to produce the output signal in the form of an alternating current waveform.

10. The power conversion system of claim 9, wherein the output stage comprises an LC tank circuit.

11. The power conversion system of claim 10, further comprising a plurality of transformers, each transformer comprising a first coil connected to a corresponding second switching stage and a second coil connected to the output stage.

12. The power conversion system of claim 9, wherein the oscillating circuit comprises a resonant frequency matched to a resonant frequency of a local electrical grid.

13. The power conversion system of claim 12, further comprising an AC synchronization circuit configured to synchronize the alternating current waveform from the output stage with a local electrical grid.

14. The power conversion system of claim 9, wherein the controller is configured to control the generation of energy packets to direct a combined energy packet signal having a frequency matched to a resonant frequency of the oscillating circuit into the oscillating circuit.

15. A power conversion system, comprising:
a plurality of direct current (DC) power sources;
a plurality of energy packet generators, each energy packet generator being connected to a corresponding DC power source and each energy packet generator comprising
a first switching stage configured to pass power from the corresponding DC power source when in a closed state,
an initial charge storage stage disposed electrically between the first switching stage and the corresponding DC power source;
an energy packet combiner comprising, for each DC power source,
a second switching stage, and
an intermediate charge storage stage disposed between the first switching stage and the second switching stage, the intermediate charge storage stage being configured to receive and store charge when the first switching stage is in a closed state and the second switching stage is in an open state, and to be electrically isolated from the corresponding DC power source and to emit an electrical energy packet when the first switching stage is in an open state and the second switching stage is in a closed state;
an output stage configured to receive a sequence of energy packets from the energy packet generators and to produce an output signal from the sequence of energy packets; and
a controller configured to control the generation of the sequence of electrical energy packets.

16. The power conversion system of claim 15, wherein each DC power source comprises one or more of a solar cell, a battery, a supercapacitor, and a fuel cell.

17. The power conversion system of claim 15, wherein each DC power source is connected to a corresponding plurality of energy packet generators each having an intermediate charge storage stage.

18. The power conversion system of claim 15, wherein the output stage comprises an oscillating circuit configured to produce the output signal in the form of an alternating current (AC) waveform.

19. The power conversion system of claim 18, further comprising a plurality of transformers, each transformer comprising a first coil connected to a corresponding second switching stage and a second coil connected to the output stage.

20. A method of converting power from an array of direct current (DC) power sources to alternating current (AC) power, the method comprising:
converting DC power from each DC power source to a series of electrical energy packets by, for each DC power source, operating a first switching stage in a closed state while operating a second switching stage in an open state thereby charging an intermediate charge storage stage located between the first switching stage and the second switching stage, and then operating the second switching stage in a closed state while operating the first switching stage in an open state to release an electrical energy packet from the intermediate storage stage;
combining the series of electrical energy packets from each DC power source to form a combined electrical energy packet signal;
directing the combined electrical energy packet signal into an oscillating circuit to drive the oscillating circuit; and
producing an alternating current (AC) output signal via the oscillating circuit.

21. The method of claim 20, wherein directing the combined electrical energy packet signal into an oscillating circuit comprises directing the combined electrical energy packet signal into an LC tank circuit.

22. The method of claim 20, wherein the combined electrical energy packet signal has a frequency matched to a resonant frequency of the oscillating circuit.

23. The method of claim 20, wherein charging the intermediate charge storage stage comprises transferring electrical charge from an initial charge storage stage to the intermediate storage stage while the first switching stage is in the closed state.

24. A power conversion system, comprising:
a plurality of direct current (DC) power sources;
a plurality of energy packet generators, each energy packet generator being connected to a corresponding DC power source to receive power from the corresponding DC power source and to selectively generate an electrical energy packet;
an energy packet combiner configured to combine electrical energy packets from the plurality of energy packet generators;
an output stage comprises an oscillating circuit configured to produce the output signal in the form of an alternating current waveform, the output stage comprising an LC tank circuit;
a plurality of transformers, each transformer comprising a first coil connected to a corresponding second switching stage and a second coil connected to the output stage; and
a controller in electrical communication with each energy packet generator and the energy packet combiner to control the generation and combination of electrical energy packets.

25. The power conversion system of claim 24, wherein each energy packet generator comprises a first switching stage in electrical communication with the corresponding DC power source.

26. The power conversion system of claim 25, further comprising, for each DC power source, a second switching stage located electrically between the first switching stage and the energy packet combiner.

27. The power conversion system of claim 26, further comprising an intermediate charge storage stage located between the first switching stage and the second switching stage.

* * * * *